US011192057B2

(12) United States Patent
Neef et al.

(10) Patent No.: US 11,192,057 B2
(45) Date of Patent: Dec. 7, 2021

(54) SECONDARY ELEMENT FOR A FILTER SYSTEM AND FILTER SYSTEM WITH A SECONDARY ELEMENT

(71) Applicant: MANN+HUMMEL GmbH, Ludwigsburg (DE)

(72) Inventors: Pascal Neef, Leonberg (DE); Joachim Schuldt, Ludwigshafen (DE); Torsten Fritzsching, Vaihingen (DE); Prabhu Kumaresan, Tenkasi Taluk (IN); Mridul Sharma, Bangalore (IN)

(73) Assignee: MANN+HUMMEL GmbH, Ludwigsburg (DE)

( * ) Notice: Subject to any disclaimer, the term of this patent is extended or adjusted under 35 U.S.C. 154(b) by 1014 days.

(21) Appl. No.: 15/787,946

(22) Filed: Oct. 19, 2017

(65) Prior Publication Data

US 2018/0036667 A1 Feb. 8, 2018

Related U.S. Application Data

(63) Continuation of application No. PCT/EP2016/058277, filed on Apr. 14, 2016.

(30) Foreign Application Priority Data

Apr. 20, 2015 (DE) .................... 10 2015 004 965.8

(51) Int. Cl.
*B01D 46/24* (2006.01)
(52) U.S. Cl.
CPC .... *B01D 46/2414* (2013.01); *B01D 2265/022* (2013.01); *B01D 2265/028* (2013.01);
(Continued)

(58) Field of Classification Search
None
See application file for complete search history.

(56) References Cited

U.S. PATENT DOCUMENTS

| 3,672,130 | A | * | 6/1972 | Sullivan | ................. B01D 46/24 55/323 |
| 4,211,543 | A | * | 7/1980 | Tokar | ............... F02M 35/02483 55/485 |

(Continued)

FOREIGN PATENT DOCUMENTS

| WO | 2006026241 A1 | 3/2006 |
| WO | 2014085769 A2 | 6/2014 |

*Primary Examiner* — Bobby Ramdhanie
*Assistant Examiner* — Brit E. Anbacht

(57) ABSTRACT

A secondary element with a first open end and a second end positioned opposite the first end has a filter medium arranged about a longitudinal axis of the secondary element and extending from the first open end to the second end. A closed end disc is disposed at the second end and seal-tightly closes off the second end. The closed end disc has a first connecting element that, for an intended installation of the secondary element in a filter system, is configured to interact with a second connecting element of a support tube of the filter system to secure the secondary element on the support tube. A filter system with such a secondary element has a support tube provided with a complementary second connecting element, wherein the secondary element is secured on the support tube by the first and second connecting elements engaging each other.

8 Claims, 9 Drawing Sheets

(52) U.S. Cl.
CPC .... *B01D 2265/06* (2013.01); *B01D 2271/027* (2013.01); *B01D 2275/201* (2013.01); *B01D 2279/60* (2013.01)

(56) References Cited

U.S. PATENT DOCUMENTS

| | | | | |
|---|---|---|---|---|
| 4,222,755 | A * | 9/1980 | Grotto | B01D 46/26 55/291 |
| 4,758,256 | A * | 7/1988 | Machado | B01D 46/0005 210/232 |
| 5,064,458 | A * | 11/1991 | Machado | F02M 35/02 55/482 |
| 5,071,456 | A * | 12/1991 | Binder | B01D 46/2414 55/502 |
| 8,480,778 | B2 * | 7/2013 | Baseotto | B01D 46/0004 55/498 |
| 8,758,470 | B2 * | 6/2014 | Blossey | F02M 35/02416 55/482 |
| 9,067,161 | B2 * | 6/2015 | Campbell | B01D 46/523 |
| 9,346,001 | B2 * | 5/2016 | Kato | B01D 46/0005 |
| 10,737,201 | B2 * | 8/2020 | Roesgen | F16N 39/06 |
| 2002/0040569 | A1 * | 4/2002 | Reinhold | B01D 29/21 55/498 |
| 2004/0134171 | A1 * | 7/2004 | Scott | B01D 46/521 55/482 |
| 2008/0190082 | A1 * | 8/2008 | Scott | B01D 46/2414 55/520 |
| 2009/0100813 | A1 * | 4/2009 | Iddings | B01D 46/2411 55/489 |
| 2009/0256354 | A1 | 10/2009 | Ullrich et al. | |
| 2011/0000458 | A1 * | 1/2011 | Muenkel | B01D 46/0021 123/198 E |
| 2014/0174296 | A1 | 6/2014 | Schultz et al. | |
| 2014/0298612 | A1 | 10/2014 | Williams et al. | |
| 2014/0325945 | A1 * | 11/2014 | Coulonvaux | B01D 46/0001 55/478 |
| 2017/0173512 | A1 * | 6/2017 | Van Den Bossche | B01D 46/2414 |

* cited by examiner

SECONDARY ELEMENT FOR A FILTER SYSTEM AND FILTER SYSTEM WITH A SECONDARY ELEMENT

CROSS-REFERENCE TO RELATED APPLICATIONS

This application is a continuation application of international application No. PCT/EP2016/058277 having an international filing date of 14 Apr. 2016 and designating the United States, the international application claiming a priority date of 20 Apr. 2015, based on prior filed German patent applications No. 10 2015 004 965.8, the entire contents of the aforesaid international application and the aforesaid German patent application being incorporated herein by reference.

BACKGROUND OF THE INVENTION

The invention concerns a secondary element for a filter system, in particular for an air filter system of an internal combustion engine, and a filter system with such a secondary element.

It is known to employ air filters in order to filter combustion intake air for internal combustion engines in motor vehicles, e.g. passenger cars, commercial vehicles, working machines, agricultural vehicles but also stationary generators and the like. Such air filters comprise in general a housing, an air inlet, and an air outlet wherein a removable and exchangeable main filter element is arranged in the housing. The housing comprises often a servicing or access cover for accessing the filter element received in the interior for maintenance. For this purpose, the filter element can be demounted and either replaced with a brand new filter element, reconditioned and reinserted, or exchanged for a previously used but reconditioned filter element.

Usually, the filter elements of air filters are exchanged after a certain operating period. Depending on the dust accumulation, the service life of an air filter can be a few days, e.g. in case of construction machinery, up to several months in less dust-laden environment.

In particular in case of frequent exchange of filter elements, the reliable and operationally safe sealing action of the filter element in a housing is important. The sealing action must be designed to be thermally resistant and to withstand vibrations. Even in devices or facilities that are exposed to strong vibrations or shocks, the sealing action of the filter element must be ensured. At the same time however the filter element itself should have, if possible, no metal elements so that it can be disposed of thermally without problem.

For protecting the clean side of an air conducting system of an internal combustion engine from penetration of dirt particles when exchanging a filter element, in air filter systems often a so-called secondary element is present which remains within the filter system upon exchange. The secondary element is seated usually at the clean side of the filter element, for example, in the interior of a round filter element and is connected with the housing of the filter system. The secondary element itself comprises also a filter medium that keeps away residual dirt particles in the air stream from the filter outlet. The secondary element itself can also be exchangeable because it may be laden with dust particles, however in much greater time intervals than the actual filter element.

U.S. Pat. No. 8,480,778 B2 discloses an air filter system in which a secondary element is present that is comprised of a filter medium in hollow cylinder arrangement that is closed off at one end by a cap and is open at the other end. With the open end, it can be put over a support tube, arranged in the interior of the filter element and connected with the filter housing, and protect in this way the outlet of the filter system against penetration of dirt particles. Over the secondary element attached to the support tube, the actual filter element is then mounted which is resting against the free end of the support tube and thus on the cap of the secondary element.

SUMMARY OF THE INVENTION

It is therefore an object of the invention to provide a secondary element for a filter system that ensures a reliable sealing action of the clean side of an air conducting system, in particular when exchanging the filter element during maintenance, while providing a simple and reliable mounting action.

A further object of the invention is to provide a filter system for receiving such an exchangeable secondary element that ensures a reliable sealing action of the clean side of an air conducting system, in particular when exchanging the filter element during maintenance.

The aforementioned objects are solved in accordance with an aspect of the invention by a secondary element with a longitudinal axis and two oppositely positioned ends that is connectable to a support tube of a filter system with one end and, according to another aspect of the invention, by a filter system with such a secondary element.

Beneficial configurations and advantages of the invention result from the additional claims, the description, and the drawing.

A secondary element with a longitudinal axis and two oppositely positioned ends is proposed that comprises a filter medium arranged about the longitudinal axis. In this context, one of the ends is open and the oppositely positioned end is seal-tightly closed off by a closed end disc. The end disc comprises a connecting means that, when mounted as intended, is provided for interaction with a connecting means of a support tube of the filter system in order to secure the secondary element on the support tube.

Advantageously, with the secondary element mounted in the filter system, a clean-side sealing action is realized by the secondary element by means of its open end that is contacting a counter element. No additional separate sealing location is required, in particular a further seal connected by foaming or the like is not required because the secondary element is closed at one end. By fixation on the support tube in the mounted state, a definite end position of the secondary element in the filter system is moreover provided.

According to a beneficial embodiment, the end disc can be fixedly connected with the filter medium, in particular fused or glued or connected by injection molding or connected by foaming. A suitable type of connection can be selected for the intended application.

According to a beneficial embodiment, the end disc can have a recess that is projecting into the interior of the secondary element. The bottom of the recess can be supported suitably on the support tube and predetermines for mounting a defined end position of the secondary element.

According to a beneficial embodiment, the secondary element can be of a conical configuration and its diameter can taper from the open end toward the closed end. This facilitates pushing on the secondary element onto the support tube.

According to a beneficial embodiment, the filter element can be formed of a nonwoven or of paper or cellulose or a mixed fiber of synthetic and cellulose. A suitable material for the intended application can be selected.

Advantageously, the filter medium can be embodied continuous with at least one seam on the circumference of the secondary element. In this way, flat sheets of filter media can be employed for the manufacture of the secondary element which are pulled onto a corresponding shaped body and fused with a seam for example to an endless web whereby the seal tightness of the secondary element is provided.

According to a beneficial embodiment, the connecting means can comprise a part of a locking connection. In this way, the connecting means can comprise locking hooks and a counter element associated with the support tube on which the locking hook or locking hooks can hook. A reverse configuration is also conceivable.

According to a beneficial embodiment, the connecting means can comprise a part of a screw connection. The connecting means can comprise an outer thread which is screwed into a complementary inner thread on the support tube. A reverse configuration is also conceivable.

According to a beneficial embodiment, the connecting means can comprise a part of a bayonet connection. The connecting means can comprise one or a plurality of locking pins which lock at a guide associated with the support tube. A reverse configuration is also conceivable.

In a beneficial embodiment, the connecting means provided on the end disc projects away from the end disc axially into the interior of the secondary element.

In a beneficial embodiment, the end disc can comprise a recess which is projecting into the interior of the secondary element and the connecting means can project from the bottom of the recess father into the interior of the secondary element. Advantageously, the recess can be embodied in a funnel shape and in particular can be embodied to conform in shape to a funnel-shaped recess of the support tube. This facilitates joining of secondary element and support tube.

According to a further aspect of the invention, a filter system is proposed comprising a housing; an inlet socket arranged at the housing for supply of a fluid to be filtered, in particular air; an outlet socket arranged at the housing for discharge of the filtered fluid, in particular an outlet socket which is centrally arranged in longitudinal direction; at least one filter element that is arranged between inlet socket and outlet socket; a support tube arranged in the interior of the housing along a housing axis for receiving a filter element, wherein the support tube is provided as a carrier of a secondary element, wherein the secondary element and the support tube each comprise connecting means that are complementary to each other with which they are connectable to each other at one of their end faces.

In this context, an advantage of such a filter system resides in the reliable and stable installation of the primary filter element as well as of the secondary element and a very economical exchangeability of the filter element and, as needed, also of the secondary element during maintenance. In particular for short service lives as they may be encountered in use in agricultural and construction machinery, a quick exchangeability is of great importance.

Advantageously, the support tube is arranged to be fixed to the housing. The secondary element is safely resting on the support tube. Upon exchange of the primary filter element, the secondary element protects the clean side of the filter element. An exchange of the secondary element can be carried out without the support tube having to be removed, which lowers the costs for the secondary element. Advantageously, with the secondary element mounted in the filter system, a clean side sealing action is realized by the secondary element by means of its open end which is seal-tightly contacting a counter element. No further separate sealing location is required, in particular a further seal connected by foaming or the like is not required because the secondary element is closed off at one end. By the fixation on the support tube in the mounted state, a definite end position of the secondary element in the filter system is moreover provided.

The secondary element, when employed as intended, can be arranged at the clean side of the primary filter element. The secondary element which is attached to the support tube and which comprises a permeable filter medium, for example, a nonwoven, has the task of continuing to keep closed the outlet of the filter system in case of an exchange of the filter element so that no dirt can penetrate into this area while the filter element is cleaned or renewed. The secondary element itself comprises thus no support tube but is comprised of the filter medium that is, for example, relatively rigid and is pushed onto the support tube of the filter system.

According to a beneficial embodiment, the secondary element can engage with its open end a groove that is arranged coaxial to the outlet socket and/or to the support tube. The open end can contact seal-tightly a groove wall. In this way, it is possible to achieve a satisfactory sealing property of the secondary element. Advantageously, the sealing location is designed as a chamber which improves the sealing properties in a simple way.

According to a beneficial embodiment, the connecting means that are complementary to each other can be embodied to be detachable without being destroyed. In this way, on the one hand, securing of the secondary element upon exchange of the primary filter element is provided; on the other hand, an exchange of the secondary element can be realized in a simple way.

According to a beneficial embodiment, the support tube can be designed conically and taper in regard to diameter away from the outlet socket along the longitudinal axis. In this way, it is possible to easily push the secondary element onto the support tube.

According to a beneficial embodiment, the secondary element can axially project past the support tube at the closed end. In this way, tolerances can be easily compensated and a safe sealing action of the secondary element at its open end can be achieved in that it can be guided reliably into its sealing groove.

According to a beneficial embodiment, the filter element can seal radially in inward direction at its outlet socket-associated end. For this purpose, on the bottom of the housing a suitable sealing surface can be provided which is producible beneficially with regard to mold technology.

According to a beneficial embodiment, the support tube of the filter system at its end where the connecting means is arranged can have a recess which can be embodied to conform in shape to a recess of the secondary element. Advantageously, the recess is of a funnel-shaped configuration. This enables self-adjusting of the connection and facilitates joining of secondary element and support tube.

Expediently, the filter system can be used as an air filter, in particular as an air filter of an internal combustion engine. The reliable operation of internal combustion engines is based also on a reliable and beneficial filtering of the intake air for the combustion operation. The described filter element provides for this purpose an economical possibility.

The use of the filter system as particle filter, in particular as particle filter of an internal combustion engine, is also advantageous. Reliable mounting and economic exchangeability of the described filter element are of decisive importance here also.

Beneficially, the secondary element can remain in the housing upon exchange of the filter element. In this way, it is ensured that the clean side of the outlet socket is effectively protected from penetration of dirt particles.

BRIEF DESCRIPTION OF THE DRAWINGS

Further advantages result from the following description of the drawings. Embodiments of the invention are illustrated in the drawings. The drawings, the description, and the claims contain numerous features in combination. A person of skill in the art will consider expediently the features also individually and combine them to further meaningful combinations.

In the Figures, same or same type components are identified with same reference characters. The Figures show only examples and are not to be understood as limiting.

DESCRIPTION OF PREFERRED EMBODIMENTS

Figure 1:
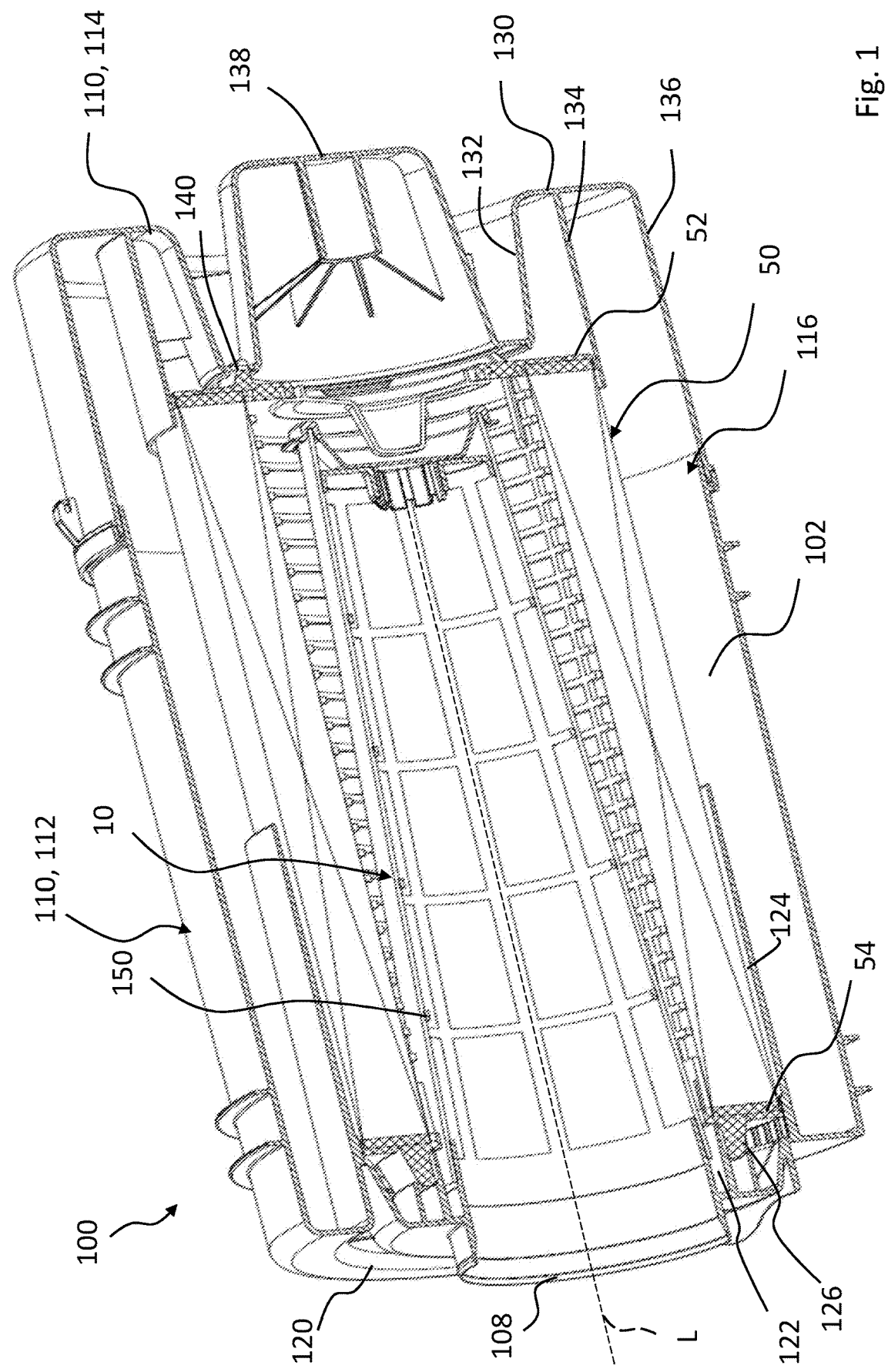
FIG. 1 shows a longitudinal section of a filter system with a primary filter element that surrounds at its clean side a secondary element, according to an embodiment of the invention.

FIG. 1 shows a longitudinal section of a filter system 100 with a primary filter element 50 that at its clean side surrounds a secondary element 10, according to an embodiment of the invention.

Figure 2:
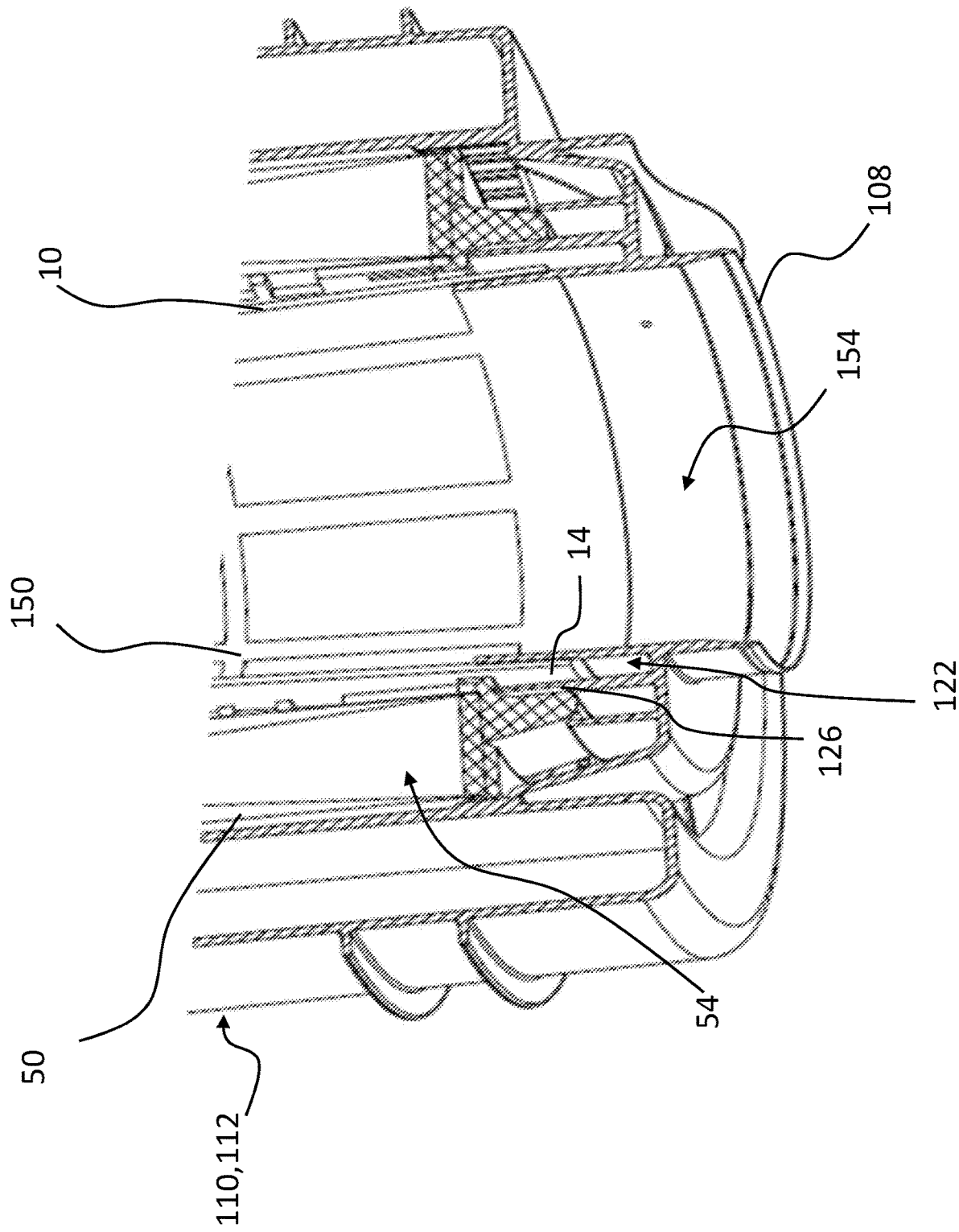
FIG. 2 shows a detail of the bottom area of the filter system of FIG. 1 in section illustration.

The filter system 100 comprises a housing 110 that is comprised of a cup 112 and a removable cover 114. FIG. 2 shows details of the bottom area of the housing 110.

The housing 110 can be embodied e.g. cylindrical. On the housing 110, an inlet socket that is not illustrated in the drawing is arranged for supplying a fluid to be filtered, in particular air. The inlet socket can be arranged radially or tangentially on the housing 110. The axial position is near the bottom 120 of the housing 110 in a region in which an inflow protection element 124 is provided in the interior of the housing 110.

On the housing 110 an outlet socket 108 for discharging the filtered fluid is arranged which is centrally positioned in longitudinal direction (longitudinal housing axis L). In the flow path between inlet socket and outlet socket 108, a cylindrical filter element 50 and a support tube 150, arranged along the longitudinal housing axis L for receiving a filter element 50, are arranged. The filter element 50 serves as a primary element and comprises a closed end disc at one end 52 and an open end disc at the oppositely positioned outlet socket-associated end 54. Both end discs comprise axially outwardly projecting spacer elements with which the filter element 50 is clamped between bottom 120 and cover 114. The end discs can be embodied e.g. of polyurethane.

The cover 114 can be screwed on at the open end 116 of the cup 112 or can be fastened with clamping elements or the like. The cover 114 comprises radially in outward direction a ridge 130 with an outer ridge wall 136 and an inner ridge wall 132 wherein the ridge 130 surrounds a central middle part 138 of the cover 114. The bottom 140 of a groove between ridge 130 and middle part 138 pushes on the spacer elements of the closed end disc of the filter element 50. The outer ridge wall 136 of the ridge 130 is part of the outer wall of the cover 114. An inner leg 134 projects past the closed end disc of the filter element 50 and forms with its radial inner surface a sealing surface for the filter element 50.

As is shown in detail in FIG. 2, the open end disc seals at the outlet socket-associated end 54 of the filter element 50 radially in inward direction against a ring 126 at the bottom 120 of the housing.

The support tube 150 adjoins the outlet socket 108 toward the housing interior and is surrounded by the filter element 50. The support tube 150 is fixedly connected with the bottom 120 of the housing 110, e.g. fused thereto.

The support tube 150 is provided as a carrier of a secondary element 10 wherein the secondary element 10 and the support tube 150 each comprise connecting elements 22, 156 complementary to each other with which they are connectable to each other at their ends 12, 152 that are opposite to the respective outlet socket-associated ends 14, 154.

The secondary element 10 engages with its open end 14 a groove 122 which is arranged coaxial to the outlet socket 108 and to the support tube 150. This forms the sealing location of the secondary element 10 which is embodied as a chamber. The groove 122 adjoins radially in inward direction the ring 126 on which the filter element 50 seals radially with its open end disc.

Raw air flows through an annular channel 102 to the filter element 50 and enters at its clean side the secondary element 10 and flows from there through the outlet socket 108 out of the housing 110.

Figure 3:
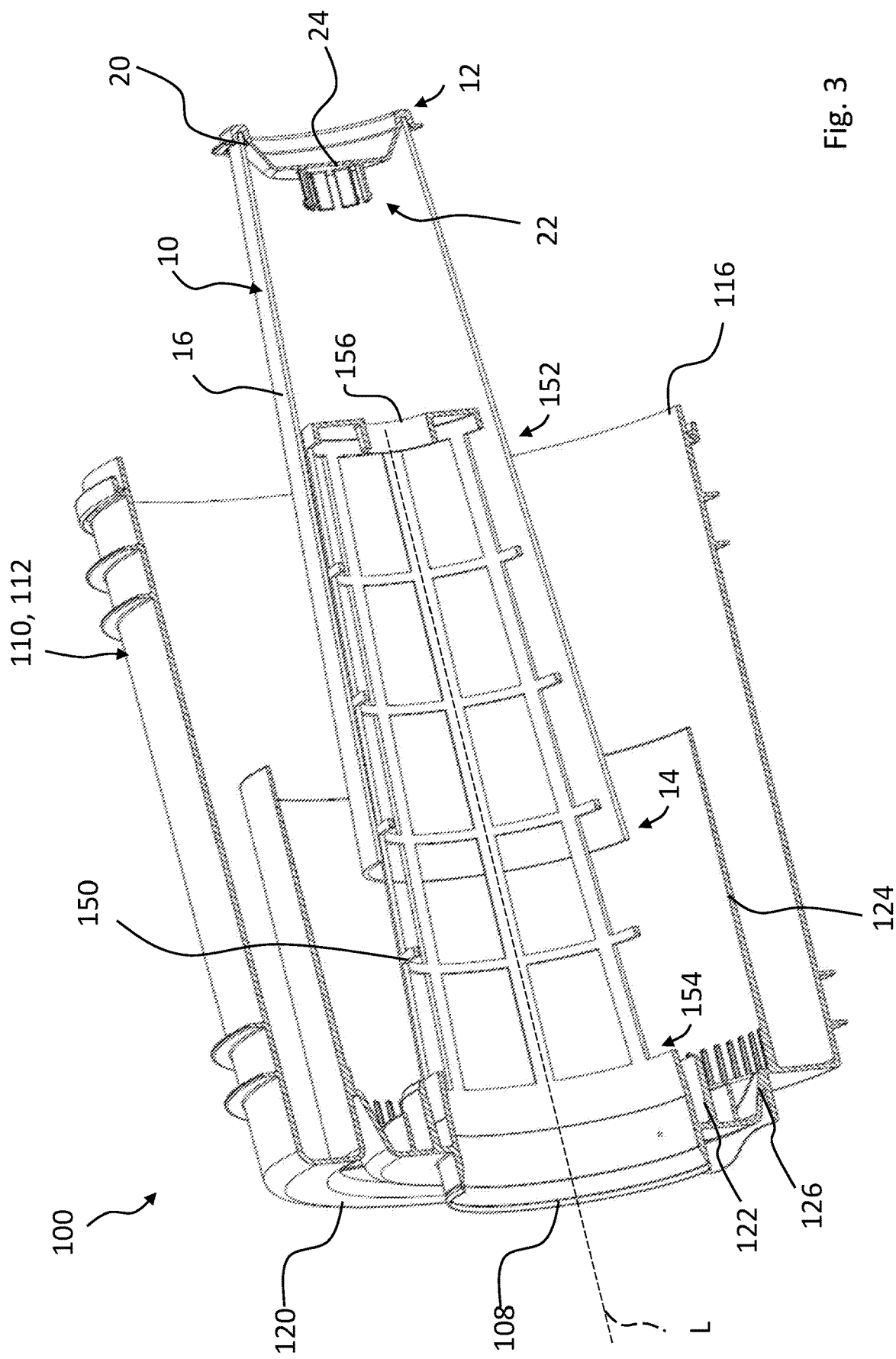
FIG. 3 shows a longitudinal section of a part of the filter system of FIG. 1 with a secondary element partially pushed onto the support tube fixed to the housing.
Figure 4:
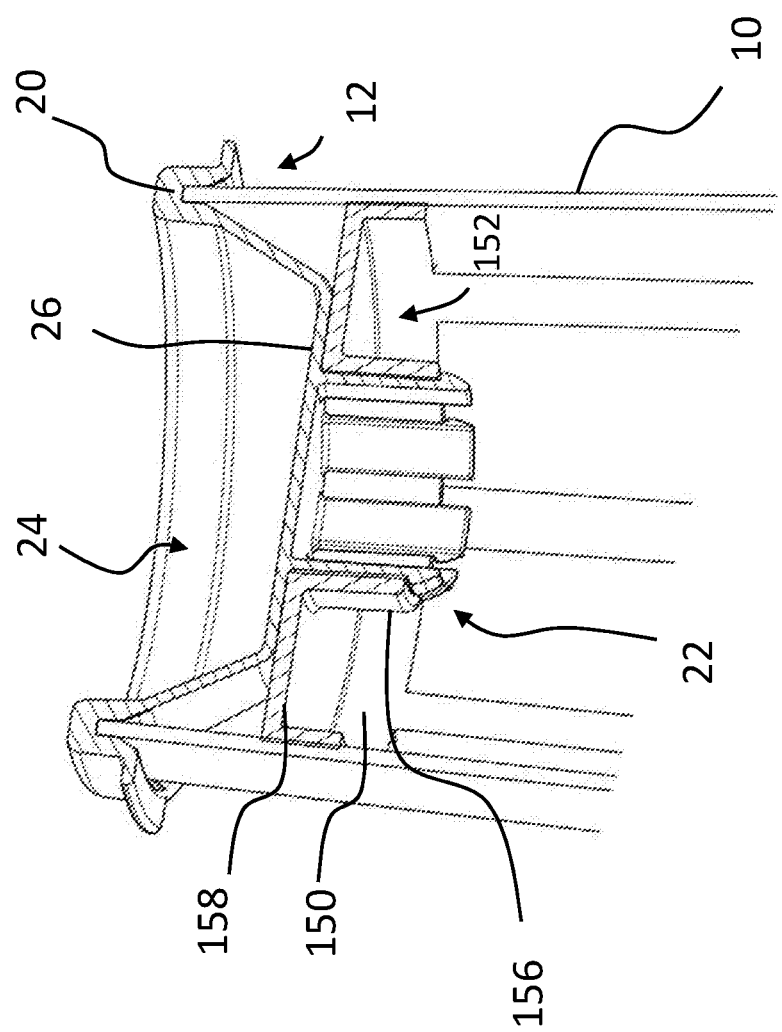
FIG. 4 shows a detail of a connection between secondary element and support tube in section illustration.

FIG. 3 shows a longitudinal section of a part of the filter system 100 of FIG. 1 with secondary element 10 partially pushed onto the support tube 150 fixed to the housing. FIG. 4 shows a detail of the connection between secondary element 10 and support tube 150 in section illustration.

The secondary element 10 extends along its longitudinal axis L (coinciding with housing axis L) between two oppositely positioned ends 12, 14 and comprises a filter medium 16 which is arranged about the longitudinal axis L wherein one of the ends 14 is open and the oppositely positioned end 12 is seal-tightly closed off by a closed end disc 20. The support tube 150 is open at the corresponding end 152. At the open end, an annular disk 158 is arranged and through its central opening the connecting means 22 of the secondary element 10 can project.

The filter medium 16 can be embodied of a nonwoven or of paper or cellulose or of a mixed fiber of synthetic and cellulose.

The end disc 20 comprises a connecting means 22 which is interacting with a complementary connecting means 156 of a support tube 150 of the filter system 100 in order to secure the secondary element 10 on the support tube 150. In the illustrated embodiment, the connecting means 22 comprises locking hooks on the end disc 11 of the secondary element 10 which can hook on a socket which forms the connecting means 156 of the support tube 150. The connecting means (connecting elements) 22, 156 are designed to be detachable without being destroyed so that the secondary element 10 is secured on the support tube 150 when exchanging the filter element 50 (FIG. 1) but, as needed, can also be exchanged.

The support tube 150 and the secondary element 10 are conically embodied and taper in regard to diameter away from the outlet socket 108 along the longitudinal axis L. The secondary element 10 is pushed onto the support tube 150 until the open end 14 of the secondary element engages the groove 122 at the bottom 120 of the housing 110 and the connecting means 22, 156 of secondary element 10 and support tube 150 connect.

Since the end disc 20 of the secondary element 10 comprises a recess 24 projecting into the secondary element 10, the secondary element 10 axially projects past the support tube 150 at the closed end 12. When the connecting means 22, 156 are in intended contact, the bottom of the recess 24 of the end disc 20 of the secondary element 10 is resting against the annular disk 158 of the support tube 150 and forms a defined end position of the secondary element 10 for mounting. Due to the defined end position, the correct mounting of the secondary element 10 can be facilitated. The recess 24 is of a funnel-shaped configuration and has a flat bottom 26. The connecting means 22 are arranged radially within the bottom 26 at a radius which is significantly smaller than the outer circumference of the bottom 26.

Figure 5:
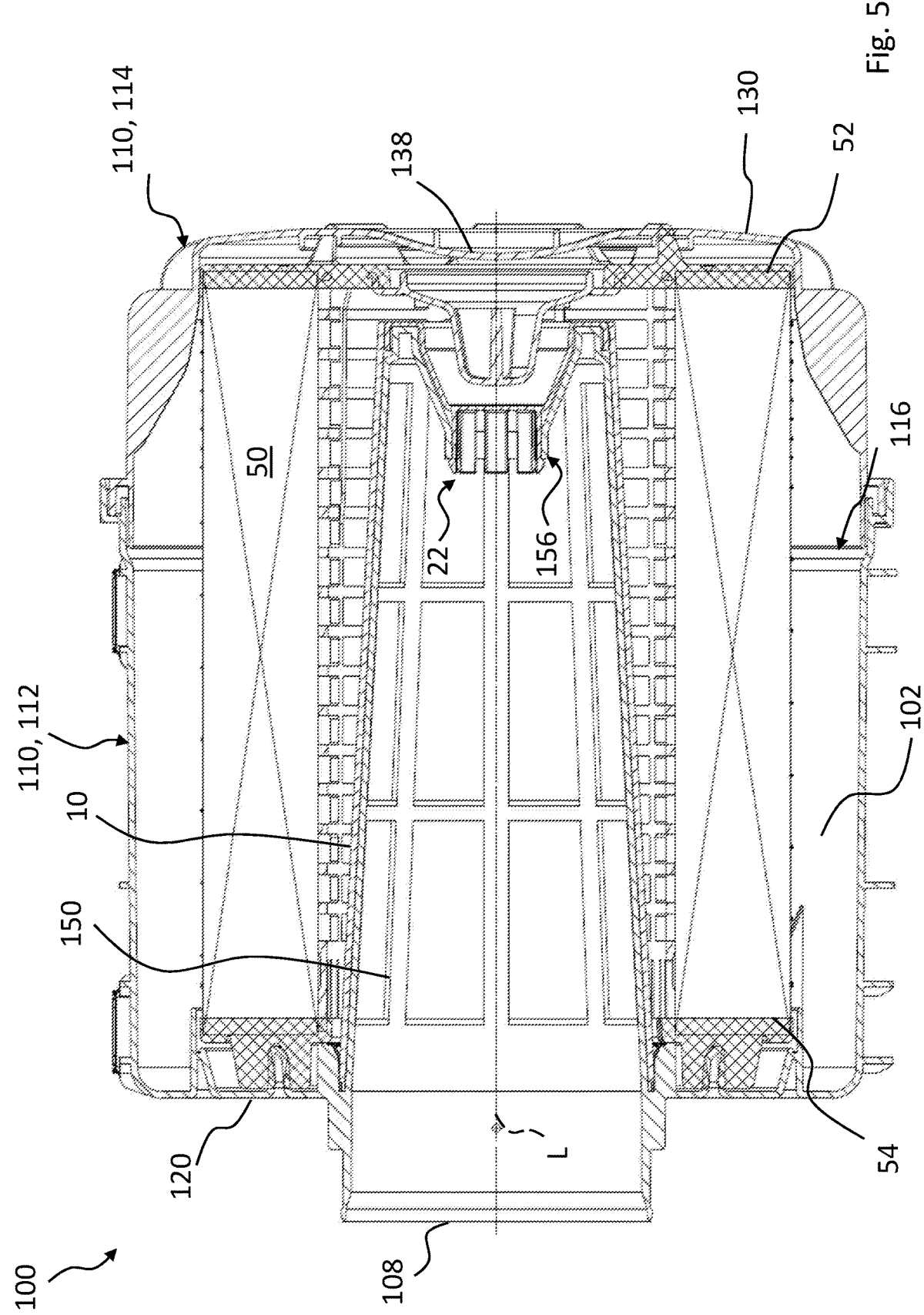
FIG. 5 shows a longitudinal section of a filter system with a primary filter element that surrounds at its clean side a secondary element, according to a further embodiment of the invention.
Figure 6:
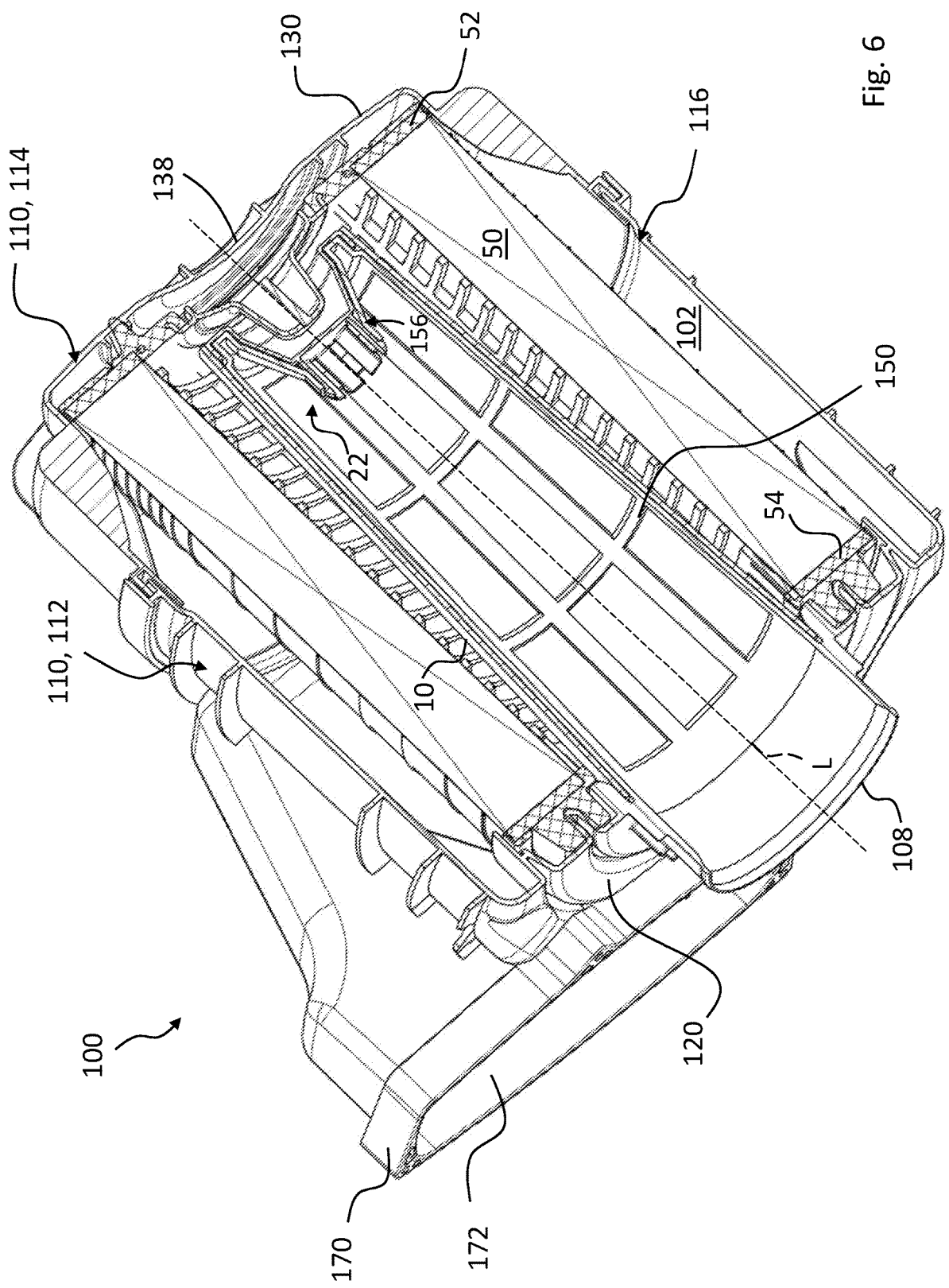
FIG. 6 shows a further longitudinal section of the embodiment according to FIG. 5.
Figure 7:
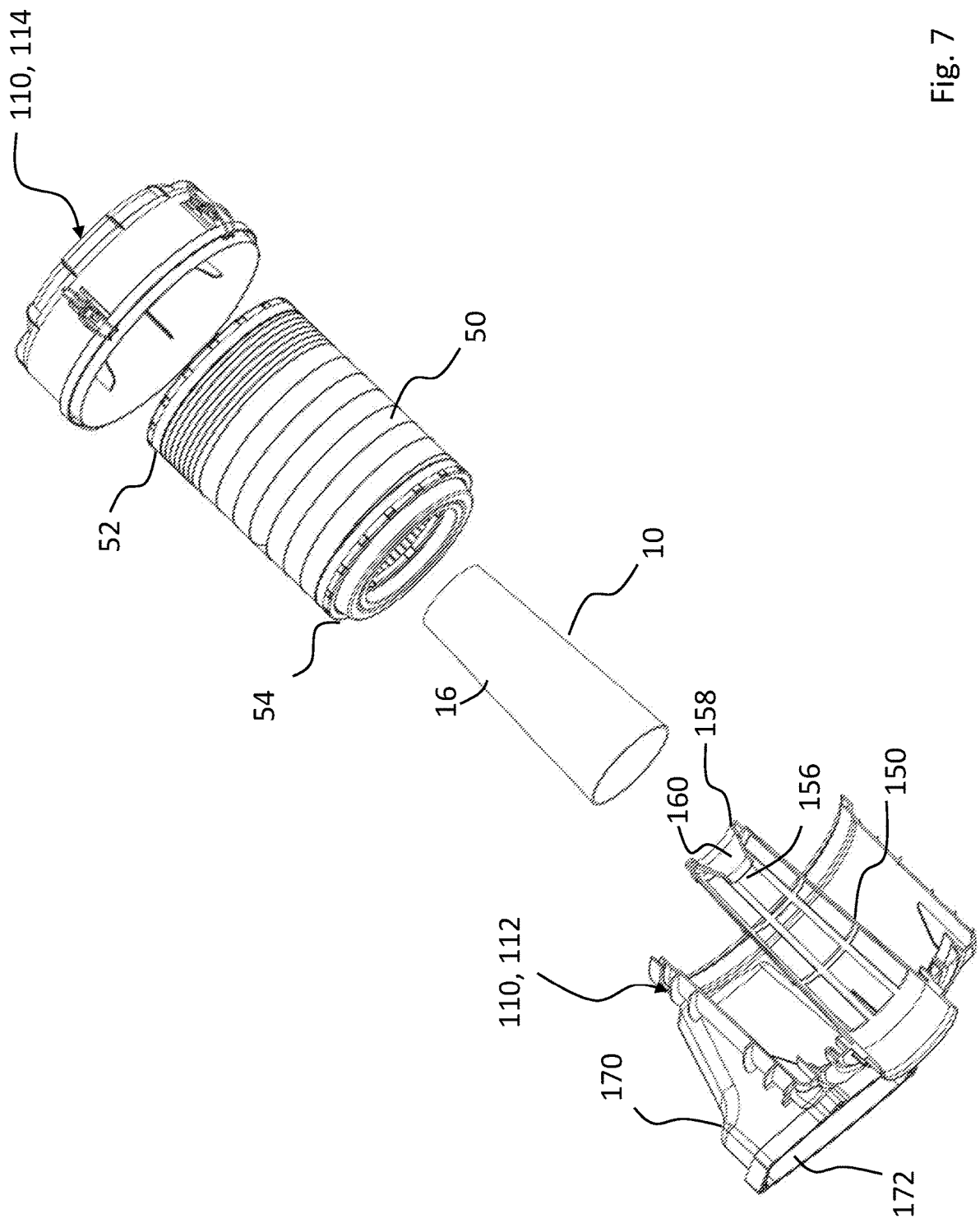
FIG. 7 is an exploded illustration of the embodiment according to FIG. 5.
Figure 8:
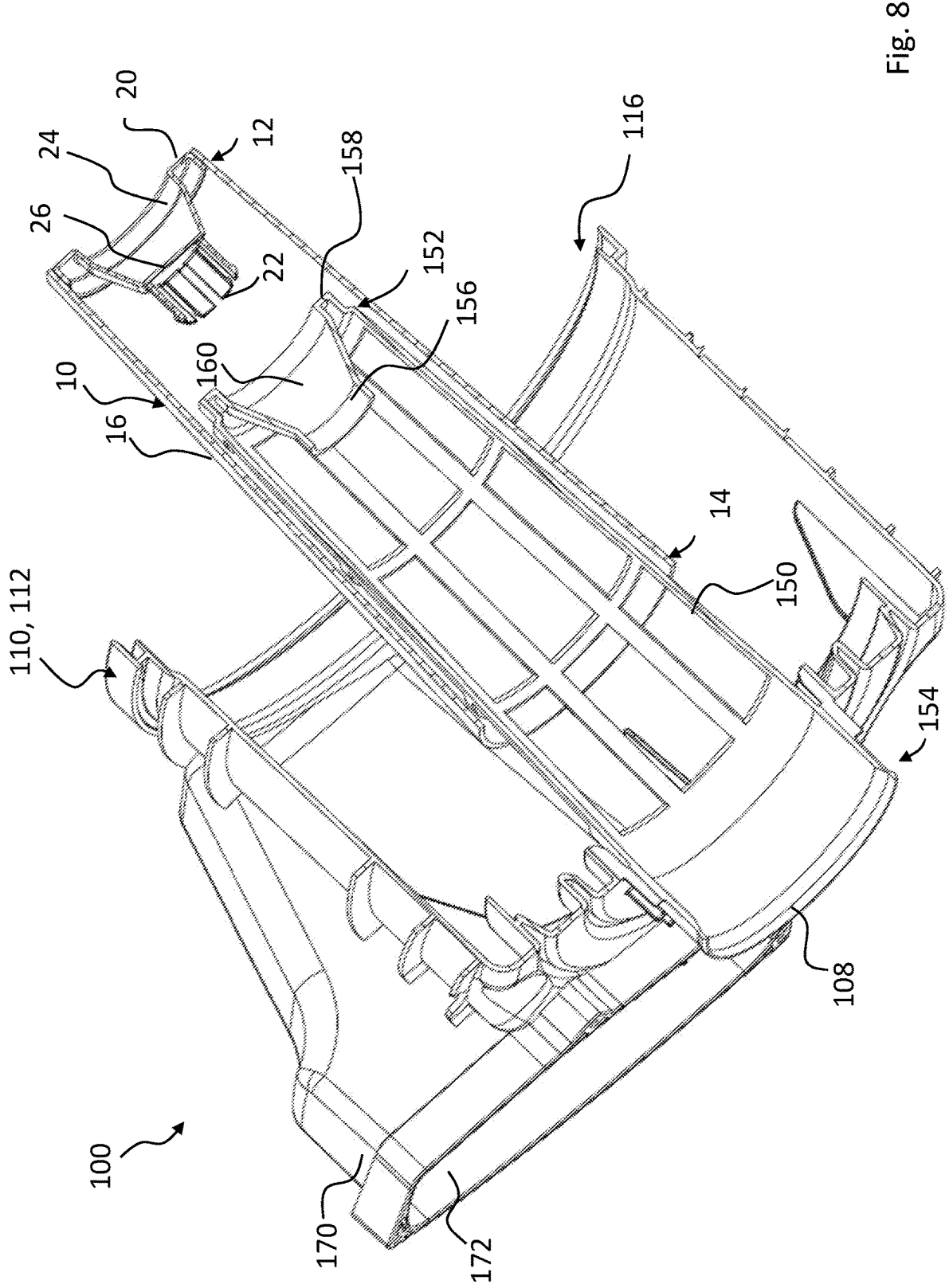
FIG. 8 shows a longitudinal section of the filter system according to FIG. 5 prior to joining support tube and secondary element.
Figure 9:
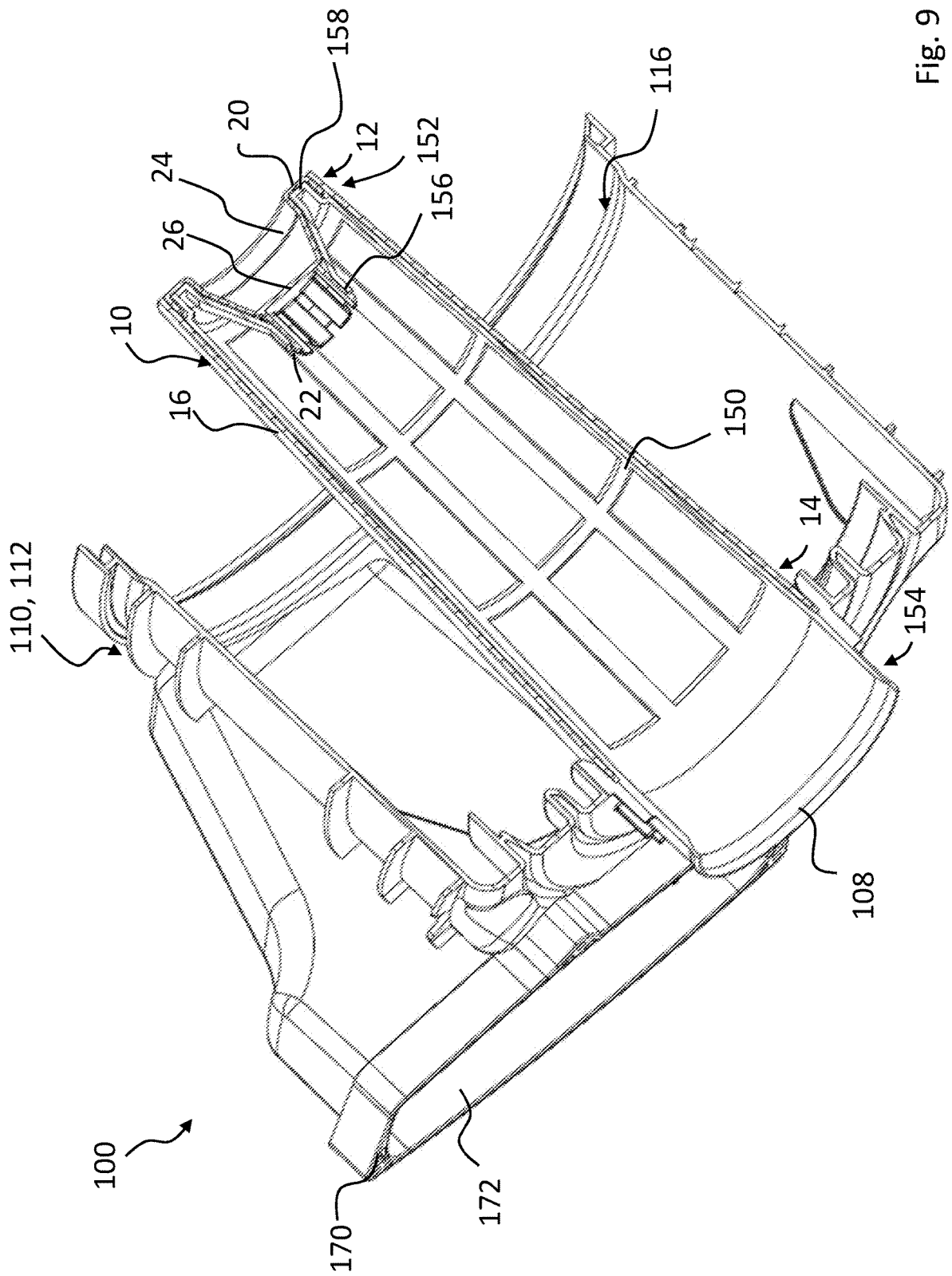
FIG. 9 shows a longitudinal section of the filter system according to FIG. 5 after joining of support tube and secondary element.

FIGS. 5 through 9 show a further embodiment of the invention. FIG. 5 shows a longitudinal section of the filter system 100 with a primary filter element 50 that at its clean side surrounds a secondary element 10, according to a further embodiment of the invention. FIG. 6 shows a further longitudinal section of the embodiment according to FIG. 5, FIG. 7 shows an exploded illustration of the embodiment according to FIG. 5, FIG. 8 shows a longitudinal section of the filter system 100 according to FIG. 5 prior to joining of support tube 150 and secondary element 10, and FIG. 9 shows a longitudinal section of the filter system 100 according to FIG. 5 after joining of support tube 150 and secondary element 10. Many elements are identical to afore described embodiments so that, for avoiding unnecessary repetitions, substantially only the differences of the embodiments will be explained.

The filter system 100 comprises a cup 112 of its housing 110 with a lateral attachment 170 with an intake opening 172 that is open in axial direction and through which the fluid to be filtered, in particular air, can enter the filter system 100. A special inflow protection element for the filter element 50 can therefore be eliminated.

The interface between secondary element 10 and support tube 150 in this embodiment is configured to be complementary in shape. The recess 24 of the secondary element 10 is of a funnel-shaped configuration but deeper than in the embodiment of FIGS. 1 through 4. The outer diameter of the flat bottom 26 of the recess 24 is only minimally greater than the radius of the connecting elements 22 formed as locking hooks, as an example.

The support tube 150 comprises a recess 160 complementary in shape to the recess 24; this facilitates introduction of the connecting elements 22 into the support tube 150.

What is claimed is:

1. A secondary element comprising:
   a tubular-shaped filter medium surrounding and elongated along a longitudinal axis and having a hollow interior, the tubular-shaped filter medium having an open first axial end and an open second axial end positioned opposite the open first axial end;
   a closed end disc fixedly connected directly onto the open second axial end of the tubular-shaped filter medium, the closed end disc closing off the tubular-shaped filter medium at the open second axial end;
   wherein the closed end disc forms a funnel-shaped recess which protrudes axially inwardly into the hollow interior of the tubular-shaped filter medium to terminate at an axially innermost end of the funnel-shaped recess;
   wherein the funnel-shaped recess at the axially innermost end has a closed bottom;
   wherein the closed end disc includes a connecting means arranged proximate to the axially innermost end of the funnel-shaped recess and arranged in the hollow interior of the tubular-shaped filter medium;
   wherein the tubular-shaped filter medium has a radially inner side that is uncovered such that, when installed in a filter housing, a support tube of the filter housing can be received into the hollow interior of the tubular-shaped filter medium and contact against the radially inner side of the tubular-shaped filter medium;
   wherein, when the secondary element is installed in the filter housing, the connecting means is configured to engage with a complimentary connecting means of the filter housing support tube to secure the secondary element onto the filter housing support tube in the filter housing.

2. The secondary element according to claim 1, wherein the closed bottom of the funnel-shaped recess is a closed flat bottom;
   wherein the connecting means of the funnel-shaped recess is arranged on the funnel-shaped recess about an outer circumference of the closed flat bottom.

3. The secondary element according to claim 2, wherein the closed end disc is fused or glued or connected by injection molding to the open second axial end of the tubular-shaped filter medium.

4. The secondary element according to claim 1, wherein the secondary element has a diameter that tapers from the open first axial end of the tubular-shaped filter medium toward the open second axial end (12) of the tubular-shaped filter medium.

5. The secondary element according to claim 1, wherein the tubular-shaped filter medium is embodied of a material selected from the group consisting of nonwoven, paper, cellulose, and a mixed fiber of synthetic and cellulose.

6. The secondary element according to claim 1, wherein the connecting means of the closed end disc comprises at least one locking hook arranged proximate to the closed axial inward end of funnel-shaped recess, the at least one locking hook projecting axially inwardly into the hollow interior of the tubular-shaped filter medium;
   wherein the at least one locking hook is a part of a locking connection locking the secondary element to the filter housing support tube.

7. The secondary element according to claim 1, wherein the connecting means of the closed end disc comprises a part of a screw connection.

8. The secondary element according to claim 1, wherein the connecting means of the closed end disc comprises a part of a bayonet connection.

\* \* \* \* \*